(No Model.) 2 Sheets—Sheet 1.

J. W. PIERCE, J. H. BOWDITCH & I. L. G. RICE.
WHEEL TIRE.

No. 340,613. Patented Apr. 27, 1886.

WITNESSES.
Chas. Spaulding
Albert D. Grover

INVENTORS.
J. Willard Pierce
James H. Bowditch
Israel L. G. Rice (No Model.) 2 Sheets—Sheet 2.
J. W. PIERCE, J. H. BOWDITCH & I. L. G. RICE.
WHEEL TIRE.
No. 340,613. Patented Apr. 27, 1886.
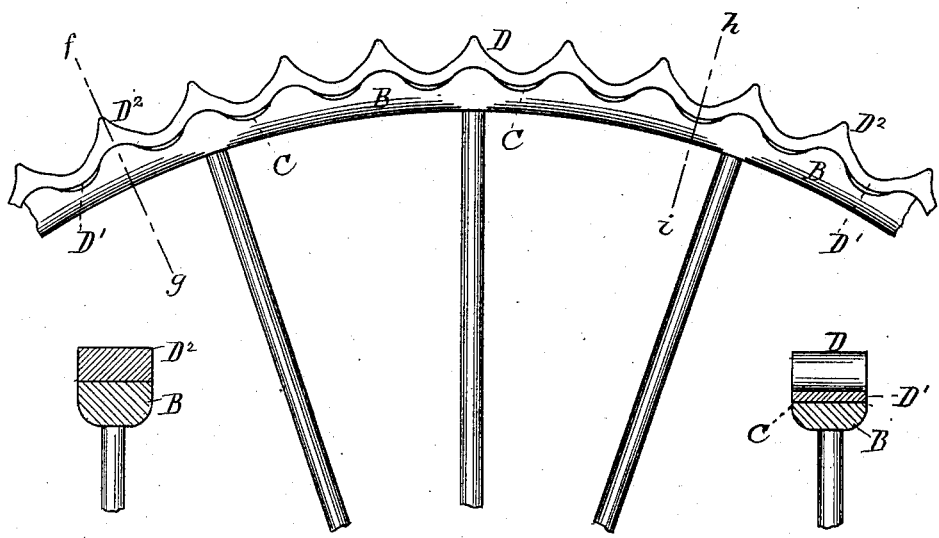
Fig. 6. Fig. 5. Fig. 7.
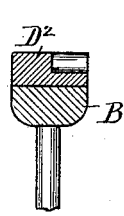 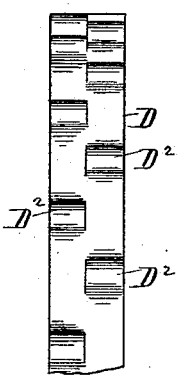 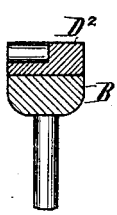
Fig. 7. Fig. 8. Fig. 10.
WITNESSES.
Chas. Spaulding.
Albert D. Grover.
INVENTORS
J. Wilmer Pierce,
James H. Bowditch,
Israel L. G. Rice.

UNITED STATES PATENT OFFICE.

J. WILLARD PIERCE, JAMES H. BOWDITCH, AND ISRAEL L. G. RICE, OF BROOKLINE, MASSACHUSETTS.

WHEEL-TIRE.

SPECIFICATION forming part of Letters Patent No. 340,613, dated April 27, 1886.

Application filed January 11, 1886. Serial No. 188,206. (No model.)

*To all whom it may concern:*

Be it known that we, J. WILLARD PIERCE, JAMES H. BOWDITCH, and ISRAEL L. G. RICE, all citizens of the United States, residing in Brookline, in the county of Norfolk and State of Massachusetts, have invented an Elastic Tire for Wheels of Vehicles, of which the following is a specification.

Our invention relates to an elastic tire for wheels for vehicles.

The object of the invention is to keep the fellies, spokes, and hub of a wheel together when they become shrunken. We attain this object by the devices illustrated in the accompanying drawings, in which—

Figure 1:
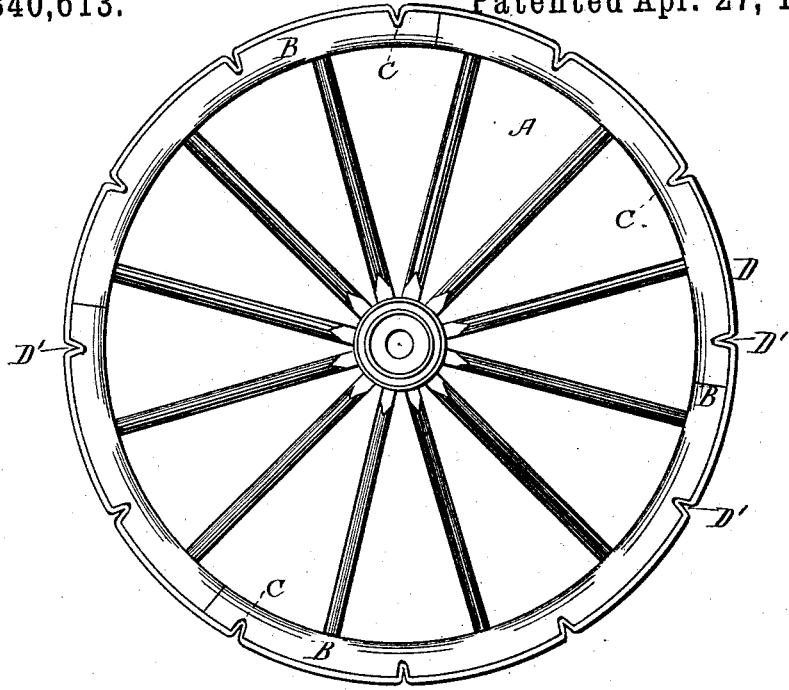
Figure 2:
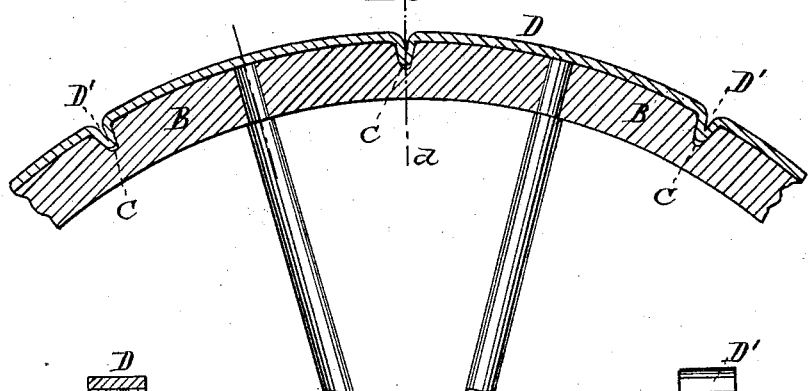
Figure 3:
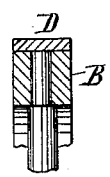
Figure 4:
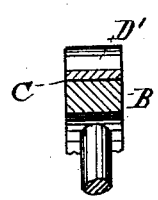

Figure 1 is a vertical view of a wheel embodying our invention. Fig. 2 is an enlarged sectional view showing an elastic corrugated tire, the corrugations being inserted into grooves or corrugations in the fellies. Fig. 3 is a cross section of the same through the line *a b*. Fig. 4 is a cross-section of the same through the line *c d*. Fig. 5 is a sectional view of a modification of the invention, showing the elastic tire with inner and outer corrugations. Fig. 6 is a cross section of the same through the line *f g*. Fig. 7 is a cross-section of the same through the line *h i*. Fig. 8 is another modification of the invention, showing the corrugations made alternate on the rim of the tire, as the projections are made alternate on the rim of the wheels of a mowing-machine. Figs. 9 and 10 are cross-sections of the same.

Similar letters refer to similar parts throughout the entire views.

The wheel A, having fellies B B B, has corrugations or grooves C C C cut in the rim of the fellies. The elastic tire D has corrugations D' D' D', which enter the corrugations in the fellies when the tire is forced onto the wheel. In order that the tire may more readily be put on the wheel, the edges of the rims of the fellies are beveled. The tire is preferably made of spring-steel, and the corrugations make the tire elastic. The corrugations or grooves in the fellies are a little larger than the corrugations of the tire, so as to allow space for the spring of the corrugations to act.

In Fig. 6 is illustrated a form of tire adapted to the wheels of agricultural implements where power is required to drive the mechanism. The outer corrugations or projections enter the earth, so as to cause the wheel to revolve when it passes over the soil, and the inner corrugations cause the tire to spring inwardly, and thus keep the parts of the wheel together when shrunken.

The principle of our invention consists of a corrugated or otherwise bent metal tire made of spring-steel or other suitable spring metal and which is adapted to bind together the various parts of the wheel when it becomes dry and shrunken and its diameter lessened.

We do not claim, broadly, an elastic tire, or a tire made of india-rubber or other similar elastic material. Mere elasticity of the material of which the tire is composed is not what we claim. We claim a tire made of spring metal bent or corrugated, so that the diameter of the tire as it is on the wheel is larger than it is off the wheel—that is, when the spring-metal tire, with its corrugations or other bends, is placed on the wheel, the diameter of the tire is increased by the corrugations or other bends expanding. This expansion or stretching of the bent spring-metal tire causes it to firmly press the rim of the wheel, and thus press the parts toward a common center, keeping the parts of the wheel firmly united.

What we claim as our invention, and desire to secure by Letters Patent, is—

1. A wheel for vehicles, provided with a steel or other spring-metal tire corrugated or otherwise bent, substantially as and for the purposes herein set forth.

2. In a wheel for vehicles, an elastic corrugated tire, in combination with the corrugated fellies, substantially as and for the purpose herein set forth.

J. WILLARD PIERCE.
JAMES H. BOWDITCH.
ISRAEL L. G. RICE.

Witnesses:
 CHAS. SPAULDING,
 ALBERT D. GROVER.